July 14, 1942.   F. P. OBENCHAIN   2,289,927
BATTERY TERMINAL CLAMP
Filed June 10, 1941

INVENTOR.
FRANK P. OBENCHAIN
BY
Kwis Hudson & Kent
ATTORNEYS

Patented July 14, 1942

2,289,927

UNITED STATES PATENT OFFICE 2,289,927

BATTERY TERMINAL CLAMP

Frank P. Obenchain, Cleveland, Ohio, assignor to Willard Storage Battery Company, Cleveland, Ohio, a corporation of West Virginia Application June 10, 1941, Serial No. 397,447

2 Claims. (Cl. 173—259)

This invention relates to terminal clamps for batteries and particularly storage batteries, and has for its chief object to provide a terminal clamping element embodying the features of simplicity and efficiency not only in the effectiveness of the clamping action on the terminal post but also in the prevention of corrosion on the adjacent surfaces of the clamp and battery terminal.

It is a feature of the present invention that the clamp embodies in one piece or unitary structure a split clamp adapted to be drawn tightly around the clamp receiving surface of the terminal and also a housing provided at the top of the clamp to receive corrosion preventing material such as grease or grease impregnated felt or other fibrous material, which housing is formed integral with the split clamp but in a manner such that it does not interfere with or reduce the clamping action on the terminal when the nut on the clamping bolt is tightened.

The invention may be further briefly summarized as consisting in certain novel details of construction of my improved clamp which will be described in the specification and set forth in the appended claims.

In the accompanying sheet of drawings wherein I have illustrated the preferred embodiment of my invention and a slight modification, Fig. 1 is a perspective view of the top portion of a storage battery both terminals of which are provided with my improved terminal clamps;

Figure 1:
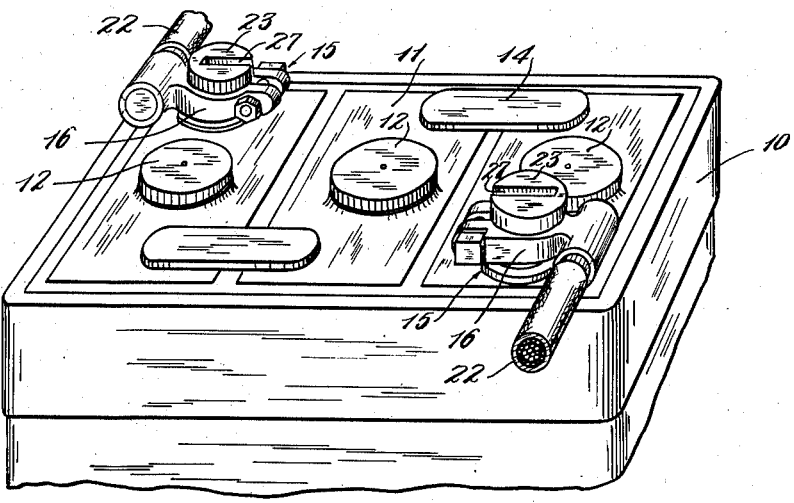

Referring now to the drawing, 10 represents the battery case, a three-cell battery being here illustrated, but of course the number of cells is wholly immaterial to the present invention. The cells are closed by cell covers 11 provided with vent plugs 12. Extending upwardly through the covers of the two end cells and at diagonally opposite corners thereof are the positive and negative terminals which are not illustrated in Fig. 1 since they are concealed by the terminal clamps, but in Figs. 3 and 5 one of these terminals is illustrated at 13. The three cells of the battery are connected together by so-called intercell connectors 14. All the parts so far described may have any suitable construction and form no part of the present invention.

My improved terminal clamp, which is designated as a whole by the reference character 15, is in the form of a unitary or one-piece casting which is generally formed of lead or of an alloy of lead and some other metal or metals, such as copper, to increase the conductivity of the clamp. This one-piece casting includes a split clamping ring 16 which per se may be similar in shape and proportions to the split ring of the clamps as heretofore constructed. The inner wall of the ring is adapted to be clamped to the battery terminal 13, and generally this wall is tapered to conform to the usual taper of the terminal. The ring 16 is split at 17 and at the free ends of the ring are formed the usual lugs or ears 18 each of which has an opening to receive a clamping bolt 19 with the head of the bolt engaging the outer face of one lug and provided with a nut 20 engaging the outer face of the opposite lug so that by screwing down the nut 20 the split ring 16 can be tightly clamped to the battery terminal 13.

The clamping ring is provided with suitable means 21 for making electrical connection with the uncovered end of the usual insulated flexible cable, portions of the two cables which are connected to the two clamps being shown at 22 in Fig. 1. The means 21 for electrically connecting the cable to the clamp as here shown is in the form of a split sleeve which may be compressed to clamp it onto the end of the cable and, if desired, may be soldered thereto. The split sleeve 21 is integral with the clamping ring and in this instance is cast integral therewith on the back wall of the clamping ring opposite the split 17. Other suitable means for electrically connecting the clamp to the cable may be employed. The parts of the clamp so far described may be of usual construction.

My improvement consists in providing at the top of the split clamping ring 16 an integral novelly formed hollow housing 23 to receive above the upper end of the terminal 13 to which the clamp is applied any suitable corrosion preventing material such as grease or grease impregnated fibrous material 24 which may be in the form of a felt disk and which will be located in the space which is thus provided between the upper end of the terminal 13 and the underside of the top of the housing. Of course the term "grease" includes oil and Vaseline. This housing is formed by a substantially cylindrical upright wall which is cast integral with the top of the split clamping ring and by a top 25 cast integral with the upright wall. The axis of this housing preferably coincides with the axis of the inner tapered clamping surface of the split clamping ring. The upright wall of the housing, while it extends up from and is integral with the top of the split clamping ring 16, is inset somewhat from the outer portion of this ring and is preferably thinner than the latter since it is not subjected to any of the clamping stresses of the ring 16.

Figure 2:
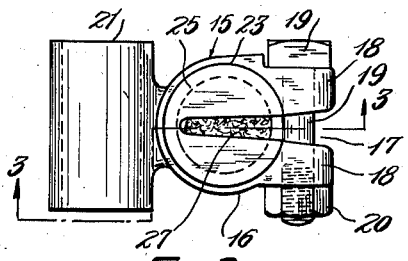
Fig. 2 is a top plan view of one of the clamps removed from the battery.
Figure 3:
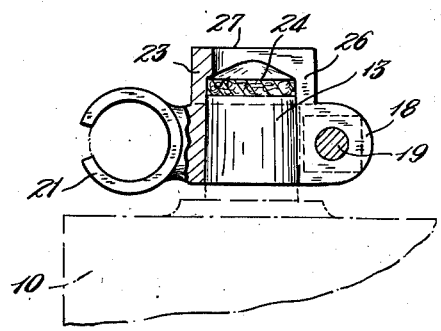
Fig. 3 is a sectional view substantially along the irregular line 3—3 of Fig. 2 with a portion of the battery shown by dotted lines.
Figure 4:
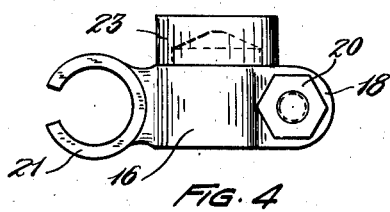
Fig. 4 is a side view of the same.

The upright wall of the housing is split vertically at 26, this split being in line with the split 17 in the clamping ring proper, as most clearly shown in Figs. 1 and 2, and the split 26 in the upright wall of the housing is extended substantially entirely across the top 25 of the housing, as clearly shown at 27 in Figs. 1, 2, and 3.

By thus splitting the top as well as the upright wall of the housing and having the split in the top of the housing form a continuation of the split in the upright portion although at right angles to each other, the housing does not reduce the flexibility of the ring and does not affect the efficiency of the clamping action between the ring and the terminal 13 when the clamp has been forced down on the terminal and is tightened thereon by tightening the nut 20. Additionally, the split 27 across the top 25 of the housing forms a convenient means for supplying grease or other corrosion preventing material to the interior of the housing above the terminal 13.

Figure 5:
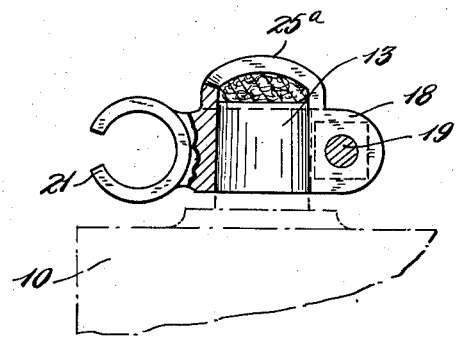
Fig. 5 is a view similar to Fig. 3 showing a slight modification.

The top of the housing is preferably made flat as this shape will facilitate the driving of the terminal clamp down onto the terminal 13 by means of a hammer or other suitable tool. However, the top may be dome-shaped both interiorly and exteriorly as shown at 25a in Fig. 5. The construction shown in Fig. 5 is otherwise like that shown in the other figures and needs no further description.

While I have shown the preferred embodiment of my invention and a slight modification, I do not desire to be confined to the precise details shown but aim in my claims to cover all modifications which do not involve a departure from the spirit and the scope of the invention.

Having thus described my invention, I claim:

1. In combination with a storage battery having a terminal, a terminal clamp comprising a split ring having an inner terminal engaging surface, means by which said surface is drawn tightly against the surface of the terminal, a housing formed integral with said ring and projecting beyond said terminal engaging surface and beyond the end of the terminal, said housing being split in line with the split in the ring and forming beyond the end of the terminal a receiving chamber for corrosion preventing material.

2. In combination with a storage battery having an upstanding terminal, a terminal clamp in the form of a split ring to which a conductor is adapted to be connected and having perforated ends, a clamping bolt extending through said perforated ends and serving to clamp the inner surface of the ring against the surface of the terminal, and a housing formed integral with the top of the ring and split in line with the split in the ring proper, said housing projecting upwardly beyond the upper end of the terminal, said housing forming above the end of the terminal a receiving chamber for corrosion preventing material.

FRANK P. OBENCHAIN.